United States Patent
Kuiper et al.

(10) Patent No.: US 11,820,392 B2
(45) Date of Patent: Nov. 21, 2023

(54) ELIMINATINON OF SAFETY ENABLE HARDWARE THROUGH USE OF CAN TRANSCEIVER WAKEUP FUNCTIONS

(71) Applicant: GM GLOBAL TECHNOLOGY OPERATIONS LLC, Detroit, MI (US)

(72) Inventors: Jacob Andrew Gerrit Kuiper, Hartland, MI (US); Cheryl A. Williams, Howell, MI (US); Natalie A Wienckowski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 17/455,587

(22) Filed: Nov. 18, 2021

(65) Prior Publication Data
US 2023/0150522 A1    May 18, 2023

(51) Int. Cl.
*G06F 11/00* (2006.01)
*B60W 50/023* (2012.01)
(Continued)

(52) U.S. Cl.
CPC ...... *B60W 50/035* (2013.01); *B60W 50/0098* (2013.01); *B60W 50/023* (2013.01);
(Continued)

(58) Field of Classification Search
CPC .... B60Q 9/007; B60Q 9/006; B60R 16/0232; B60W 30/02; B60W 50/08;
(Continued)

(56) References Cited

U.S. PATENT DOCUMENTS

| 9,311,762 B2 * | 4/2016 | Godley | B60W 10/00 |
| 2008/0147265 A1 * | 6/2008 | Breed | G07C 5/0808 |
| | | | 701/424 |

(Continued)

FOREIGN PATENT DOCUMENTS

| CN | 111149141 A | * | 5/2020 | G05D 1/0287 |
| CN | 113200002 A | * | 8/2021 | B60R 16/023 |

(Continued)

OTHER PUBLICATIONS

Jan, Krakora, and Hanzalek Zdenek. "Verifying Real-Time Properties of Can Bus by Timed Automata." (2010). (Year: 2010).*
(Continued)

*Primary Examiner* — Cuong H Nguyen
(74) *Attorney, Agent, or Firm* — Lorenz & Kopf, LLP (57) ABSTRACT

In exemplary embodiments, methods, systems, and vehicles are provided, with the vehicle including vehicle systems, a communication bus, a first processor, and a communication bus transceiver. The first processor is configured to at least facilitate: determining whether a potential safety concern is present pertaining to control the vehicle systems; and providing communications along the communication bus of the vehicle, the communications including an indication of the potential safety concern. The communication bus transceiver is coupled to the first processor and configured to at least facilitate: recognizing the indication of the potential safety concern; and inhibiting the control for the vehicle systems when the indication of the potential safety concern is recognized by the communication bus transceiver.

20 Claims, 3 Drawing Sheets

(51) Int. Cl.
  *B60W 50/035* (2012.01)
  *H04L 12/40* (2006.01)
  *B60W 50/00* (2006.01)

(52) U.S. Cl.
  CPC .... *H04L 12/40* (2013.01); *H04L 2012/40215* (2013.01); *H04L 2012/40273* (2013.01)

(58) Field of Classification Search
  CPC ............ B60W 2556/45; G07C 5/0816; G05D 2201/0212; G08G 1/096725
  USPC ............................................. 701/29–2, 29.2
  See application file for complete search history.

(56) References Cited

U.S. PATENT DOCUMENTS

| | | | | |
|---|---|---|---|---|
| 2012/0089299 | A1* | 4/2012 | Breed | G01S 15/88 701/1 |
| 2015/0347258 | A1* | 12/2015 | Du | G06F 11/3062 714/4.2 |
| 2020/0204395 | A1* | 6/2020 | Takahashi | H04L 12/40117 |

FOREIGN PATENT DOCUMENTS

| | | | | |
|---|---|---|---|---|
| CN | 116137584 A | * | 5/2023 | ........ B60W 50/0098 |
| DE | 102022122734 A1 | * | 5/2023 | ........ B60W 50/0098 |

OTHER PUBLICATIONS

Baz, Mohammed. Use of Inferential Statistics to Design Effective Communication Protocols for Wireless Sensor Networks. Diss. University of York, 2014. (Year: 2014).*
Baykent, Hayri Kerem. Implementation of a low-cost smart camera apllication on a cots system. MS thesis. Middle East Technical University, 2011. (Year: 2011).*
Freitag, Johannes. an abstract of "Virtual Timing Isolation Safety-Net for Multicore Processors." (2020). (Year: 2020).*
N. I. Deligiannis et al "Automating the Generation of Programs Maximizing the Repeatable Constant Switching Activity in Microprocessor Units via MaxSAT," in IEEE Transactions on Computer-Aided Design of Integrated Circuits and Systems, doi: 10.1109/TCAD.2023 (Year: 2023).*
"Cost Analysis of Nondeterministic Probabilistic Programs" by Peixin Wang; PLDI '19, June 22š26, (Year: 2019).*
An abstract of "Virtual Timing Isolation Safety-Net for Multicore Processors" byJohannes Freitag; Publication date: Aug. 5, 2020. (Year: 2020).*

\* cited by examiner

ELIMINATINON OF SAFETY ENABLE HARDWARE THROUGH USE OF CAN TRANSCEIVER WAKEUP FUNCTIONS

INTRODUCTION

The technical field generally relates to vehicles and, more specifically, to methods and systems for providing safety hardware control using vehicle hardware.

Vehicles today include various systems that may require oversight by one or more other systems or devices, for example to help ensure safety. However, existing systems or devices may not always be optimal.

Accordingly, it is desirable to provide improved methods and systems for providing oversight of vehicle systems, for example to help ensure safety. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes: determining, via a first processor, whether a potential safety concern is present pertaining to control for one or more vehicle systems of a vehicle; providing, via the first processor, communications along a communication bus of the vehicle, the communications including an indication of the potential safety concern; recognizing, via a communication bus transceiver, the indication of the potential safety concern; and inhibiting the control for the one or more vehicle systems when the indication of the potential safety concern is recognized by the communication bus transceiver.

Also in an exemplary embodiment, the communication bus includes a vehicle CAN communication bus; and the communication bus transceiver includes a CAN transceiver that is coupled to the vehicle CAN communication bus.

Also in an exemplary embodiment, the step of recognizing the indication includes recognizing the indication of the potential safety concern via pattern recognition with respect to messages received by the communication bus transceiver from the first processor along the communication bus.

Also in an exemplary embodiment, the step of providing the communications includes providing, via the first processor, a separate message indicating the potential safety concern along the communication bus; and the step of recognizing the indication includes recognizing, via the communication bus transceiver, the separate message.

Also in an exemplary embodiment, the step of providing the communications includes providing, via the first processor, a modified control message indicating the potential safety concern along the communication bus; and the step of recognizing the indication includes recognizing, via the communication bus transceiver, the modified control message.

Also in an exemplary embodiment, the step of providing the communications includes providing, via the first processor to a second processor of the vehicle, communications along the communication bus of the vehicle, the communications including instructions for control along with the indication of the potential safety concern; and the step of inhibiting the control for the one or more vehicle systems includes inhibiting implementation of the instructions for control when the indication of the potential safety concern is recognized by the communication bus transceiver.

Also in an exemplary embodiment, the step of providing the communications includes providing, via the first processor to a second processor of the vehicle, communications along the communication bus of the vehicle, the communications including instructions for control along with the indication of the potential safety concern; and the step of inhibiting the control for the one or more vehicle systems includes inhibiting implementation of the instructions for control when the indication of the potential safety concern is recognized by the communication bus transceiver.

In another exemplary embodiment, a system is provided that includes a first processor and a communication bus transceiver. The first processor is configured to at least facilitate: determining whether a potential safety concern is present pertaining to control for one or more vehicle systems of a vehicle; and providing communications along a communication bus of the vehicle, the communications including an indication of the potential safety concern; and. The communication bus transceiver is coupled to the first processor and configured to at least facilitate: recognizing the indication of the potential safety concern; and inhibiting the control for the one or more vehicle systems when the indication of the potential safety concern is recognized by the communication bus transceiver.

Also in an exemplary embodiment, the communication bus transceiver is configured to at least facilitate recognizing the indication of the potential safety concern via pattern recognition with respect to messages received by the communication bus transceiver from the first processor along the communication bus.

Also in an exemplary embodiment, the first processor is configured to at least facilitate providing a separate message indicating the potential safety concern along the communication bus; and the communication bus transceiver is configured to at least facilitate recognizing the indication by recognizing the separate message.

Also in an exemplary embodiment, the first processor is configured to at least facilitate providing a modified control message indicating the potential safety concern along the communication bus; and the communication bus transceiver is configured to at least facilitate recognizing the indication by recognizing the modified control message.

Also in an exemplary embodiment, the first processor is configured to at least facilitate providing, to a second processor of the vehicle, communications along the communication bus of the vehicle, the communications including instructions for control along with the indication of the potential safety concern; and the communication bus transceiver is configured to at least facilitate inhibiting the control for the one or more vehicle systems by inhibiting implementation of the instructions for control when the indication of the potential safety concern is recognized by the communication bus transceiver.

Also in an exemplary embodiment, the communication bus transceiver is configured to at least facilitate inhibiting the control for the one or more vehicle systems by inhibiting output from the second processor for implementation of the instructions for control when the indication of the potential safety concern is recognized by the communication bus transceiver.

In another exemplary embodiment, a vehicle is provided that includes one or more vehicle systems, a communication bus, a first processor, and a communication bus transceiver. The first processor is configured to at least facilitate: determining whether a potential safety concern is present pertaining to control for the one or more vehicle systems; and providing communications along the communication bus of the vehicle, the communications including an indication of the potential safety concern. The communication bus transceiver is coupled to the first processor and configured to at least facilitate: recognizing the indication of the potential safety concern; and inhibiting the control for the one or more vehicle systems when the indication of the potential safety concern is recognized by the communication bus transceiver.

Also in an exemplary embodiment, the communication bus includes a vehicle CAN communication bus; and the communication bus transceiver includes a CAN transceiver that is coupled to the vehicle CAN communication bus.

Also in an exemplary embodiment, the communication bus transceiver is configured to at least facilitate recognizing the indication of the potential safety concern via pattern recognition with respect to messages received by the communication bus transceiver from the first processor along the communication bus.

Also in an exemplary embodiment, the first processor is configured to at least facilitate providing a separate message indicating the potential safety concern along the communication bus; and the communication bus transceiver is configured to at least facilitate recognizing the indication by recognizing the separate message.

Also in an exemplary embodiment, the first processor is configured to at least facilitate providing a modified control message indicating the potential safety concern along the communication bus; and the communication bus transceiver is configured to at least facilitate recognizing the indication by recognizing the modified control message.

Also in an exemplary embodiment, the first processor is configured to at least facilitate providing, to a second processor of the vehicle, communications along the communication bus of the vehicle, the communications including instructions for control along with the indication of the potential safety concern; and the communication bus transceiver is configured to at least facilitate inhibiting the control for the one or more vehicle systems by inhibiting implementation of the instructions for control when the indication of the potential safety concern is recognized by the communication bus transceiver.

Also in an exemplary embodiment, the communication bus transceiver is configured to at least facilitate inhibiting the control for the one or more vehicle systems by inhibiting output from the second processor for implementation of the instructions for control when the indication of the potential safety concern is recognized by the communication bus transceiver.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
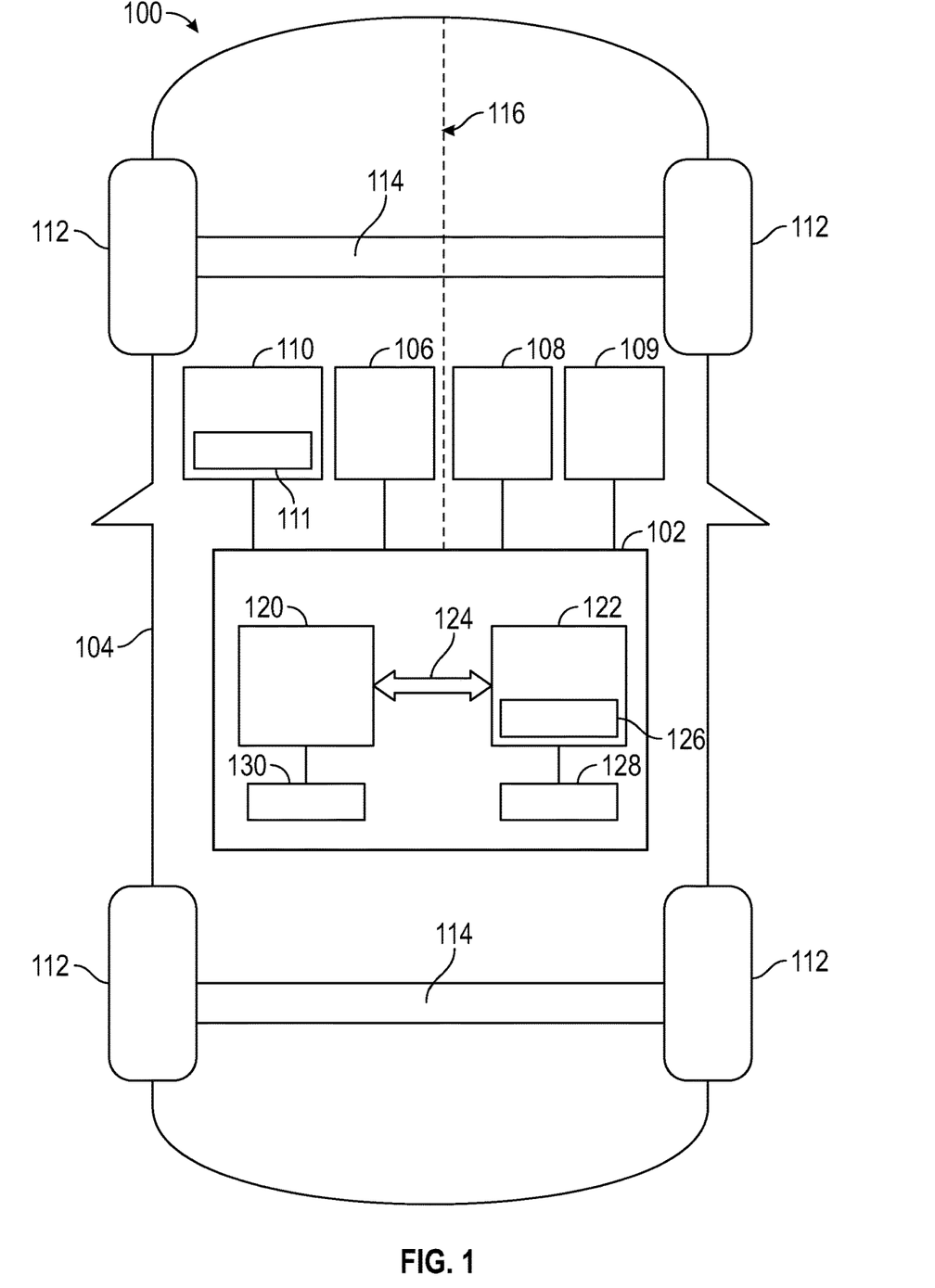
FIG. 1 is a functional block diagram of a vehicle that includes a control system for providing oversight of one or more vehicle systems, in accordance with exemplary embodiments.

FIG. 1 illustrates a vehicle 100, according to an exemplary embodiment. As described in greater detail further below, the vehicle 100 includes a control system 102 that is configured for providing oversight of one or more vehicle systems in view of potential safety concerns, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system having a motor 111. In certain exemplary embodiments, the motor 111 comprised an internal combustion engine, an electric motor/generator, and/or a hybrid motor, and the drive system 110 further includes a coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor and a hybrid electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102 and/or via one or more other control systems of the vehicle 100. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102 and/or via one or more other control systems of the vehicle 100.

Also in various embodiments, the vehicle 100 also includes a number of other systems 109. In various embodiments, the other systems 109 may include a fuel pump system, a battery charging system, a fuel injector system, a vehicle light system (e.g., for illuminating a roadway on which the vehicle 100 is travelling), and/or any number of other different types of systems.

In various embodiments, the control system 102 controls operation of vehicle systems (including, without limitation, the vehicle systems 106, 108, 109, and 110 described above), including providing oversight thereof (including modifying and/or disabling the system when appropriate for safety concerns, and so on).

As depicted in FIG. 1, in various embodiments, the control system 102 includes a sensor array 130, a first controller 120, a second controller 122, a communication bus (e.g., a vehicle CAN bus) 124, one or more transceivers 126, one or more actuators 128, and a sensor array 130.

In various embodiments, the sensor array 130 includes various sensors that measure and/or obtain sensor data as to operation of the vehicle 100 and the systems thereof, including without limitation potential problems and/or safety concerns. In certain embodiments, the sensor array 130 includes one or more wheel speed sensors, vehicle speed sensors, engine speed sensors, accelerometers, temperature sensors, and/or other sensors pertaining to operation of the vehicle 100 and the systems thereof, including without limitation potential problems and/or safety concerns.

In various embodiments, the first controller 120 receives the sensor data from the sensor array 130, and makes determinations based on the sensor data as to potential problems or safety concerns for the vehicle 100. In certain embodiments, the first controller 120 receives the sensor data via the communication bus 124. In certain embodiments, one or more sensors of the sensor array 130 may be part of and/or otherwise coupled to the first controller 120.

Also in various embodiments, the first controller 120 provides instructions to second controller 122 via the communication bus 124 for controlling various vehicle systems (such as the vehicle systems 106, 108, 109, and/or 110 described above), including in certain embodiments via the one or more actuators 128 that are part of and/or coupled to the vehicle systems. Also in various embodiments, the first controller 120 provides oversight over the second controller 122, the vehicle systems, and the actuators 128 (when applicable), including by controlling commands for controlling the vehicle systems (e.g., in certain embodiments, commands to the actuators 128 for controlling the vehicle systems) in appropriate situations in which a potential problem or safety concern is present. Also in certain embodiments, the first controller 120 provides instructions for disabling and/or other inhibiting control commands from the second controller 122 for controlling the vehicle systems (e.g., in certain embodiments, by inhibiting control commands to the actuators 128) under such circumstances in which a potential problem or safety concern is present, for example as set forth in greater detail further below in connection with the functional block diagram of the control system 102 of FIG. 2 and the process 300 of FIG. 3. In certain embodiments, the first controller 120 also includes a transceiver (e.g., a CAN transceiver) similar to the transceiver 126 described further below in connection with the second controller 122.

In addition, in various embodiments, the second controller 122 receives instructions from the first controller 120 via the communication bus 124 of FIG. 1, and provides commands for controlling the vehicle systems (e.g., in certain embodiments, commands for operation of the actuators 128) in accordance with the instructions.

The second controller 122 includes or is coupled to a transceiver 126. In various embodiments, the transceiver 126 comprises a CAN transceiver that includes pattern recognition functionality in order to determine when the first processor 242 is providing instructions for disabling the control of the vehicle systems (e.g., in certain embodiments, by disabling the actuators 128), and to disable the output from the second processor 262 (e.g., in certain embodiments, disabling the output from the second processor 262 to the actuator 128) when the first processor 242 provides such instructions for disabling the output. In various embodiments, the second controller 122 and the transceiver 126 (along with the first controller 120) provide these functions in connection with the functional block diagram of the control system 102 of FIG. 2 and the process 300 of FIG. 3. In various embodiments, the transceiver 126 comprises a physical media attachment device that is utilized in connection with the communication bus (e.g., CAN bus).

Figure 2:
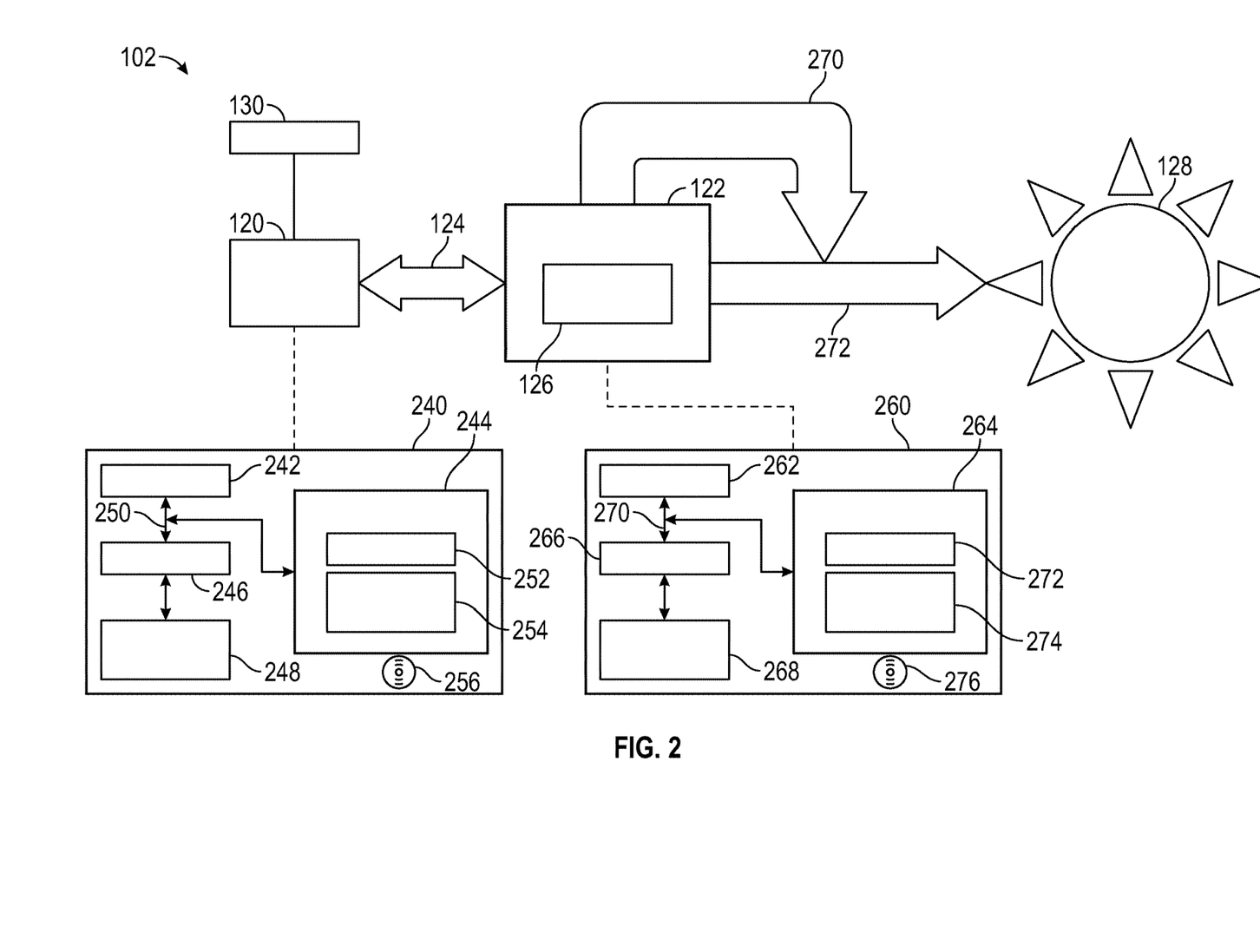
FIG. 2 is a functional block diagram of the control system of FIG. 1, in accordance with an exemplary embodiment.

FIG. 2 is a functional block diagram of the control system 102 of FIG. 1, in accordance with an exemplary embodiment. As shown in FIG. 2, in various embodiments, the first controller 120 provides instructions to the second controller 122 via the communication bus 124 for control commands 272 that are provided from the second controller 122 for controlling the vehicle systems (and/or in certain embodiments, the control commands for the actuators 128) to control operation thereof. Also as shown in FIG. 2, in various embodiments, the transceiver 126 uses pattern recognition to determine when a problem or potential safety concern is present based on the messages provided by the first controller 120. In addition, as shown in FIG. 2, the transceiver 126 blocks output of the second controller 122 via one or more transceiver actions 270 that thereby provide safety control over the vehicle systems (e.g., in certain embodiments, via the actuators 128).

Also as shown in FIG. 2, the first and second controllers 120, 122 each include respective first and second computer systems 240, 260, as described in greater detail below in accordance with an exemplary embodiment. In various embodiments, the first and second computer systems 240, 260 may comprise the first and second controllers 120, 122, respectively.

As shown in FIG. 2, in an exemplary embodiment, the first computer system 240 includes a processor 242, a memory 244, an interface 246, a storage device 248, and a computer bus 250.

The processor 242 performs the computation and control functions of the first computer system 240, and may comprise any type of processor or multiple processors, single integrated circuits such as a microprocessor, or any suitable number of integrated circuit devices and/or circuit boards working in cooperation to accomplish the functions of a processing unit. During operation, the processor 242 executes one or more programs 252 contained within the memory 244 and, as such, controls the general operation of the first computer system 240 and the computer system of the first computer system 240, generally in executing the processes described herein, such as the process 30 described further below in connection with FIG. 3.

The memory 244 can be any type of suitable memory. For example, the memory 244 may include various types of dynamic random access memory (DRAM) such as SDRAM, the various types of static RAM (SRAM), and the various types of non-volatile memory (PROM, EPROM, and flash). In certain examples, the memory 244 is located on and/or co-located on the same computer chip as the processor 242. In the depicted embodiment, the memory 244 stores the above-referenced program 252 along with one or more stored values 274 (e.g., including, in various embodiments, one or more threshold values for providing oversight and/or control over vehicle system actions).

The bus 250 serves to transmit programs, data, status and other information or signals between the various components of the computer system of the first computer system 240. The interface 246 allows communication to the first computer system 240, for example from a system driver and/or another computer system, and can be implemented using any suitable method and apparatus. In one embodiment, the interface 246 obtains the various data from the sensor array 130, among other possible data sources. The interface 246 includes one or more network interfaces to communicate with other systems or components. In various embodiments, the interface 246 includes one or more network interfaces to communicate with technicians, and/or one or more storage interfaces to connect to storage apparatuses, such as the storage device 248.

The storage device 248 can be any suitable type of storage apparatus, including various different types of direct access storage and/or other memory devices. In one exemplary embodiment, the storage device 248 comprises a program product from which memory 244 can receive a program 252 that executes one or more embodiments of one or more processes of the present disclosure, such as the steps of the process 300 discussed further below in connection with FIG. 3. In another exemplary embodiment, the program product may be directly stored in and/or otherwise accessed by the memory 244 and/or a disk (e.g., disk 256), such as that referenced below.

The bus 250 can be any suitable physical or logical means of connecting computer systems and components. This includes, but is not limited to, direct hard-wired connections, fiber optics, infrared and wireless bus technologies. During operation, the program 252 is stored in the memory 244 and executed by the processor 242.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 242) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the first computer system 240 may also otherwise differ from the embodiment depicted in FIG. 2, for example by being coupled to or otherwise utilizing one or more remote computer systems and/or other control systems.

Also as depicted in FIG. 2, in various embodiments, the second computer system 260 includes a processor 262, a memory 264 with programs 272 and stored values 274 stored therein, a bus 124, an interface 266, a storage device 268, and/or a disk 276, with similar structure and/or functions as respective components of the first computer system 240 as described above.

In addition, also as depicted in FIG. 2, in certain embodiments, the transceiver 126 (e.g., a CAN transceiver, as noted above) includes at least some processing capability, including for recognizing and/or determining when a potential problem or safety is concerned, based on pattern recognition of messages received by the transceiver 126 from the first controller 120 via the communication bus 124. In certain embodiments, the transceiver 126 includes one or more components for such recognition and/or determination, such as one or more ASIC, controller, processor, analog, and/or digital components.

Figure 3:
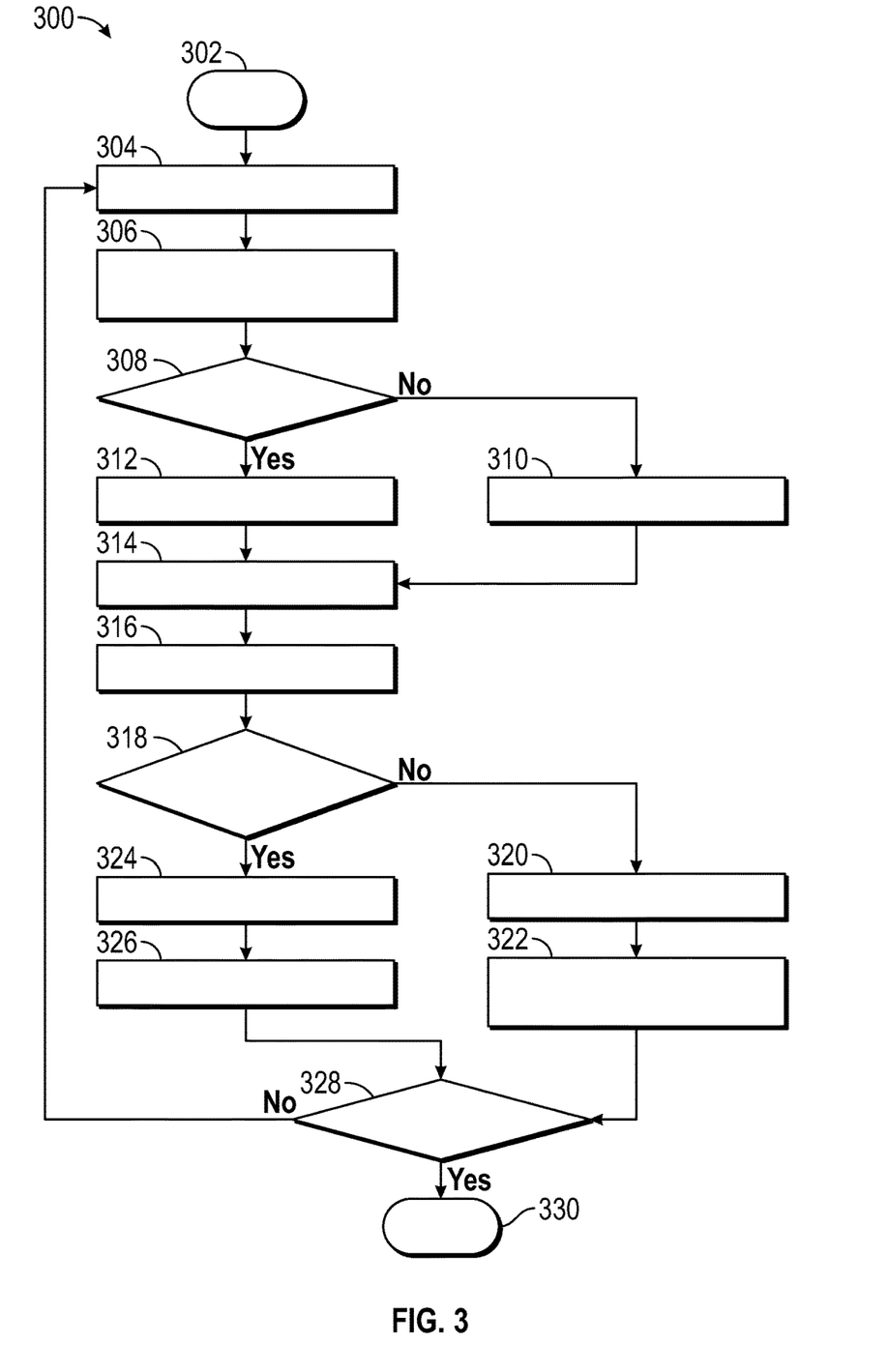
FIG. 3 is a flowchart of a process for providing oversight of one or more vehicle systems, and that can be implemented in connection with the vehicle of FIG. 1 and the control system of FIGS. 1 and 2, in accordance with exemplary embodiments.

FIG. 3 is a flowchart of a process 300 for providing oversight of one or more vehicle systems, in accordance with exemplary embodiments. In various embodiments, the process 300 may be implemented in connection with the vehicle 100 of FIG. 1 and the control system 102 of FIGS. 1 and 2, in accordance with exemplary embodiments.

As depicted in FIG. 3, in various embodiments, the process 300 begins at step 302. In one embodiment, the process 300 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 300 are performed continuously during operation of the vehicle.

Sensor data is obtained (step 304). In various embodiments, the sensor data is obtained via the sensor array 130 of FIG. 1 with respect to the operation of the vehicle and the vehicle systems thereof, for example as described above in connection with FIG. 1. For example, in various embodiments, the sensor array incudes values of wheel speed, vehicle speed, vehicle acceleration, motor speed, temperature, and the like pertaining to the vehicle and the operation of vehicle systems.

In various embodiments, determinations are made as to the sensor data (step 306). In certain embodiments, the first processor 242 of FIG. 1 makes determinations as to preferred operating conditions for the various vehicle systems 106-110 of FIG. 1, and desired instructions for the vehicle systems and/or the actuators 128 in relation thereto. Also in various embodiments, the first processor 242 also makes determinations pertaining to potential safety issues pertaining to the actuators 128, the vehicle systems, and/or the vehicle 100 in general. For example, in certain embodiments, the processor 242 makes one or more determinations as to whether current and/or proposed operation of the vehicle systems (e.g., in certain embodiments, via the actuators 128 for the vehicle systems) pose any safety concerns for the vehicle 100 (e.g., based on whether the actuators 128 are operating correctly and/or in range, whether the vehicle systems are operating correctly and/or in range, whether the sensor values are within in acceptable range, whether the processor 262 of the second controller 122 is operating within an acceptable range, and so on).

A determination is made as to whether a potential safety concern is present (step 308). In various embodiments, this determination is part of or based on the determinations or assessments of step 306 via the first processor 242.

If it is determined that there are no potential safety concerns present, then the process proceeds to step 310. During step 310, the first processor 242 generates standard messages for operation of the vehicle systems 106-110 and instructions for the vehicle systems and/or actuators 128 of FIG. 2 for controlling such operations. For example, in certain embodiments, during step 310, the first processor 242 generates standard safety messages for commands to be provided to the actuators 128 of FIG. 2 for controlling one or more vehicle systems 106-110 of FIG. 1 (such as, by way of example, a fuel pump system, a battery charging system, a fuel injector system, a vehicle light system, and so on), and/or in certain embodiments the commands may be provided directly to the vehicle systems 106-110 for control thereof.

Conversely, if it is instead determined that there are one or more potential safety issues (e.g., pertaining to operation of the actuators 128 and/or vehicle systems 106-110 presently at issue during this step), then the first processor 242 generates one or more modified messages pertaining to the potential safety concerns (step 312). For example, in certain embodiments, during step 312, the first processor 242 generates a separate message reflecting the potential safety 12 or removes a message specifically used to identify that the system should continue operating and is healthy. In certain other embodiments, during step 312, the first processor 242 modifies the original or standard message (e.g., of step 310) to represent the potential safety concern, for example by modifying the original or standard message (e.g., so as to include a unique message identification or different data bytes that the transceiver has been configured to recognize and indicate the receipt of).

Following steps 310 and/or 312, communications are performed (step 314). In various embodiments, communications are performed from the first controller 120 to the second controller 122 of FIGS. 1 and 2. In various embodiments, the communications include any instructions for the vehicle systems and/or for the actuators 128 of FIG. 2, along with any potential safety concerns pertaining thereto. Also in various embodiments, the communications are performed along the communications bus 124 of FIGS. 1 and 2 (e.g., a vehicle CAN bus). In various embodiments, the communications include or omit the messages of steps 310 and/or 312 that are transmitted via instructions provided by the first processor 242, and that are received by the second controller 122 and transceiver 126 of FIGS. 1 and 2.

Pattern recognition is performed (step 316). In various embodiments, the transceiver 126 of FIGS. 1 and 2 (e.g., a CAN transceiver that is part of and/or coupled to the second controller 122) performs pattern recognition of the communications (e.g., messages) from the first controller 120 from step 314, and determines therefrom whether a potential safety concern is present pertaining to the actuators 128, the vehicle systems 106-110, and/or the vehicle 100. In certain embodiments, the transceiver 126 determines whether the communicated messages include a separate message from the first controller 120 indicating a potential safety concern. In certain other embodiments, the transceiver 126 determines whether a message from the first controller 120 includes a modified message or format (such as a unique message identification or different data bytes that the transceiver has been configured to recognize and indicate the receipt of), indicating a potential safety concern.

In various embodiments, a determination is made as to whether the indication of a potential safety concern is recognized by the transceiver (step 318). In various embodiments, this determination is made by the transceiver 126 based on the pattern recognition of step 316.

In various embodiments, if a potential safety concern is not indicated by messages transmitted from controller 1 120 and therefore not observed by transceiver 126 in step 318, then actuator commands are provided as normal (step 320). In certain embodiments, during step 320, the second processor 262 of FIG. 2 provides commands for the actuators 128 to operate the vehicle systems 106-110 (and/or in certain embodiments the commands are provided directly to the vehicle systems) based on instructions provided from the first processor 242 as reflected in the communicated messages of steps 310 and 314 (e.g., as originally determined based on the sensor data of step 304). Also in various embodiments, the transceiver 126 does nothing to inhibit these commands, as no potential safety concerns have been detected. In various embodiments, these commands are then implemented (e.g., by the actuators 128 and/or by the vehicle systems themselves) (step 322) in operating the vehicle systems 106-110, and the process then proceeds to step 328 (described further below).

Conversely, in various embodiments, if a potential safety concern is indicated by messages transmitted from controller 1 120 and observed by transceiver 126in step 318, then commands are instead inhibited or blocked (step 324). Specifically, in various embodiments, the transceiver 126 inhibits or blocks the output of the second controller 122 (i.e., of the second processor 262 thereof), so that instructions are not provided to the actuators 128 and/or the vehicle systems. Accordingly, in various embodiments, the actuators are stopped and/or the vehicle systems are stopped (step 326), in view of the potential safety problem (e.g., resulting in stopping of operation of the vehicle systems 106-110). For example, in certain embodiments fuel injectors, lights, or other components may be turned off completely, or may be fixed to an existing state (e.g., on or off), during steps 324 and 326.

During step 328, a determination is made as to whether the process 300 is complete. For example, in certain embodiments, the process 300 is determined to be complete when the vehicle 100 is turned off, and/or if a functionality or system using the process 300 is turned off, and so on.

In various embodiments, if the process 300 is not yet complete, then the process 300 returns to step 304 in a new iteration. In various embodiments, new and updated sensor information is utilized in a new iteration of the process 300, beginning with step 304, and the process 300 continues.

Conversely, in various embodiments, if it is determined that the process 300 is complete, then the process 300 terminates at step 330.

Accordingly, methods, systems, and vehicles are provided for providing oversight of vehicle systems and control for potential safety concerns. In various embodiments, a communication bus (e.g., CAN bus) transceiver utilizes pattern recognition from messages obtained from a first controller along the communication bus in recognizing a potential safety concern, and stops actuator and/or vehicle system operation (and/or changes thereof) by blocking the output of a second controller when a potential safety concern is recognized.

In various embodiments, the methods, systems, and vehicles provide independence for vehicle components and systems, such as those required by safety standards such as ISO 26262.

It will be appreciated that the systems, vehicles, and methods may vary from those depicted in the Figures and described herein. For example, the vehicle 100 of FIG. 1, the control system 102 of FIGS. 1 and 2, and/or the components thereof may vary in different embodiments. It will similarly be appreciated that the steps of the process 300 may differ from that depicted in FIG. 3, and/or that various steps of the process 300 may occur concurrently and/or in a different order than that depicted in FIG. 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method comprising:
providing, via a first processor onboard a vehicle, instructions for control of one or more vehicle systems of the vehicle that control operation of the vehicle, the one or more vehicle systems including one or more actuators;
providing, via a second processor that is disposed onboard the vehicle and that is coupled between the first processor and the one or more vehicle systems via a communication bus, the second processor configured to provide, in accordance with the instructions received from the first processor, commands for control of the one or more vehicle systems via the one or more actuators;
providing, via the first processor, oversight and control over the second processor and the one or more vehicle systems, including disabling or inhibiting the commands from the second processor for control of the one or more vehicle systems;
determining, via the first processor, whether a potential safety concern is present pertaining to control for the one or more vehicle systems of the vehicle, wherein the potential safety concern is deemed to be present based on vehicle sensor data when the one or more actuators are operating outside of a predetermined range of acceptable values;
providing, via the first processor, communications along the communication bus of the vehicle, the communications including an indication of the potential safety concern with modified instructions for disabling or inhibiting of the commands of the second processor for the one or more actuators of the one or more vehicle systems;
recognizing, via a communication bus transceiver, the indication of the potential safety concern and the modified instructions from the first processor via pattern recognition; and
inhibiting the control for the one or more vehicle systems when the indication of the potential safety concern is recognized by the communication bus transceiver, by disabling or inhibiting the commands from the second processor to the one or more actuators of the one or more vehicle systems in accordance with the modified instructions provided by the first processor.

2. The method of claim 1, wherein the one or more vehicle systems comprise one or more of a braking system, a steering system, and a drive system of the vehicle.

3. The method of claim 1, wherein the step of recognizing the indication comprises recognizing the indication of the potential safety concern via pattern recognition with respect to messages received by the communication bus transceiver from the first processor along the communication bus.

4. The method of claim 1, wherein:
the step of providing the communications comprises providing, via the first processor, a separate message indicating the potential safety concern along the communication bus; and
the step of recognizing the indication comprises recognizing, via the communication bus transceiver, the separate message.

5. The method of claim 1, wherein:
the step of providing the communications comprises providing, via the first processor, a modified control message indicating the potential safety concern along the communication bus; and
the step of recognizing the indication comprises recognizing, via the communication bus transceiver, the modified control message.

6. The method of claim 1, wherein:
the step of providing the communications comprises providing, via the first processor to the second processor of the vehicle, the communications along the communication bus of the vehicle, the communications including the instructions for control along with the indication of the potential safety concern; and
the step of inhibiting the control for the one or more vehicle systems comprises inhibiting implementation of the instructions for control when the indication of the potential safety concern is recognized by the communication bus transceiver.

7. The method of claim 6, wherein:
the step of inhibiting the control for the one or more vehicle systems comprises inhibiting, via the communication bus transceiver, output from the second processor for implementation of the instructions for control when the indication of the potential safety concern is recognized by the communication bus transceiver.

8. A system comprising:
a first processor that is disposed onboard a vehicle and that is configured to at least facilitate providing instructions for control of one or more vehicle systems of the vehicle that control operation of the vehicle, the one or more vehicle systems including one or more actuators;
a second processor that is disposed onboard the vehicle and that is coupled between the first processor and the one or more vehicle systems via a communication bus, the second processor configured to receive the instructions from the first processor and provide commands, in accordance with the instructions, for control of the one or more vehicle systems via the one or more actuators;
wherein the first processor is coupled to the second processor via a communication bus, and is further configured to at least facilitate:
providing oversight and control over the second processor and the one or more vehicle systems, including disabling or inhibiting the commands from the second processor for control of the one or more vehicle systems;
determining whether a potential safety concern is present pertaining to control for the one or more vehicle systems of the vehicle, wherein the potential safety concern is deemed to be present based on vehicle sensor data when the one or more actuators are operating outside of a predetermined range of acceptable values; and providing communications along a communication bus of the vehicle, the communications including an indication of the potential safety concern, wherein the first processor is configured to provide the communications including the indication of the potential safety concern with modified instructions for disabling or inhibiting of the commands of the second processor for the one or more actuators of the one or more vehicle systems; and a communication bus transceiver coupled to the first processor and configured to at least facilitate:

recognizing the indication of the potential safety concern and the modified instructions from the first processor via pattern recognition; and inhibiting the control for the one or more vehicle systems when the indication of the potential safety concern is recognized by the communication bus transceiver, by disabling or inhibiting the commands from the second processor to the one or more actuators of the one or more vehicle systems in accordance with the modified instructions provided by the first processor.

9. The system of claim 8, wherein the communication bus transceiver is configured to at least facilitate recognizing the indication of the potential safety concern via pattern recognition with respect to messages received by the communication bus transceiver from the first processor along the communication bus.

10. The system of claim 8, wherein:
the first processor is configured to at least facilitate providing a separate message indicating the potential safety concern along the communication bus; and
the communication bus transceiver is configured to at least facilitate recognizing the indication by recognizing the separate message.

11. The system of claim 8, wherein:
the first processor is configured to at least facilitate providing a modified control message indicating the potential safety concern along the communication bus; and
the communication bus transceiver is configured to at least facilitate recognizing the indication by recognizing the modified control message.

12. The system of claim 8, wherein:
the first processor is configured to at least facilitate providing, to the second processor of the vehicle, the communications along the communication bus of the vehicle, the communications including the instructions for control along with the indication of the potential safety concern; and
the communication bus transceiver is configured to at least facilitate inhibiting the control for the one or more vehicle systems by inhibiting implementation of the instructions for control when the indication of the potential safety concern is recognized by the communication bus transceiver.

13. The system of claim 12, wherein the communication bus transceiver is configured to at least facilitate inhibiting the control for the one or more vehicle systems by inhibiting output from the second processor for implementation of the instructions for control when the indication of the potential safety concern is recognized by the communication bus transceiver.

14. A vehicle comprising:
one or more vehicle systems including one or more actuators and that control operation of the vehicle;
a communication bus;
a first processor that is disposed onboard the vehicle and that is configured to provide instructions for control of the one or more vehicle systems; and
a second processor that is disposed onboard the vehicle and that is coupled between the first processor and the one or more vehicle systems via the communication bus, the second processor configured to receive the instructions from the first processor and provide commands, in accordance with the instructions, for control of the one or more vehicle systems via the one or more actuators;
wherein the first processor is coupled to the second processor via the communication bus, and is further configured to at least facilitate:
providing oversight and control over the second processor and the one or more vehicle systems, including disabling or inhibiting the commands from the second processor for control of the one or more vehicle systems;
determining whether a potential safety concern is present pertaining to control for the one or more vehicle systems, wherein the potential safety concern is deemed to be present based on vehicle sensor data when the one or more actuators are operating outside of a predetermined range of acceptable values; and
providing communications along the communication bus of the vehicle, the communications including an indication of the potential safety concern, wherein the first processor is configured to provide the communications including the indication of the potential safety concern with modified instructions for disabling or inhibiting of the commands of the second processor for the one or more actuators of the one or more vehicle systems; and
a communication bus transceiver coupled to the first processor and configured to at least facilitate:
recognizing the indication of the potential safety concern and the modified instructions from the first processor via pattern recognition; and
inhibiting the control for the one or more vehicle systems when the indication of the potential safety concern is recognized by the communication bus transceiver, by disabling or inhibiting the commands from the second processor to the one or more actuators of the one or more vehicle systems in accordance with the modified instructions provided by the first processor.

15. The vehicle of claim 14, wherein the one or more vehicle systems comprise one or more of a braking system, a steering system, and a drive system of the vehicle.

16. The vehicle of claim 14, wherein the communication bus transceiver is configured to at least facilitate recognizing the indication of the potential safety concern via pattern recognition with respect to messages received by the communication bus transceiver from the first processor along the communication bus.

17. The vehicle of claim 14, wherein:
the first processor is configured to at least facilitate providing a separate message indicating the potential safety concern along the communication bus; and
the communication bus transceiver is configured to at least facilitate recognizing the indication by recognizing the separate message.

18. The vehicle of claim 14, wherein:
the first processor is configured to at least facilitate providing a modified control message indicating the potential safety concern along the communication bus; and
the communication bus transceiver is configured to at least facilitate recognizing the indication by recognizing the modified control message.

19. The vehicle of claim 14, wherein:
the first processor is configured to at least facilitate providing, to the second processor of the vehicle, the communications along the communication bus of the vehicle, the communications including the instructions for control along with the indication of the potential safety concern; and
the communication bus transceiver is configured to at least facilitate inhibiting the control for the one or more vehicle systems by inhibiting implementation of the instructions for control when the indication of the potential safety concern is recognized by the communication bus transceiver.

20. The vehicle of claim 19, wherein the communication bus transceiver is configured to at least facilitate inhibiting the control for the one or more vehicle systems by inhibiting output from the second processor for implementation of the instructions for control when the indication of the potential safety concern is recognized by the communication bus transceiver.

* * * * *